(Model.) S. C. ABBOT & C. M. GATTRELL.
Car Coupling.

No. 239,416. Patented March 29, 1881.

Attest:
H. D. Pennie
A. M. Long

Saml C. Abbot.
Chas M. Gattrell.
Inventors.

By H. J. Abbot
Atty.

UNITED STATES PATENT OFFICE.

SAMUEL C. ABBOT AND CHARLES M. GATTRELL, OF ZANESVILLE, OHIO.

CAR-COUPLING.

SPECIFICATION forming part of Letters Patent No. 239,416, dated March 29, 1881.

Application filed February 12, 1881. (Model.)

*To all whom it may concern:*

Be it known that we, SAMUEL C. ABBOT and CHARLES M. GATTRELL, of Zanesville, in the county of Muskingum and State of Ohio, have invented certain new and useful Improvements in Car-Couplings; and we do hereby declare that the following is a full, clear, and exact description of the invention, which will enable others skilled in the art to which it appertains to make and use the same, reference being had to the accompanying drawings, and to the letters of reference marked thereon, which form a part of this specification, in which—

Figure 1:
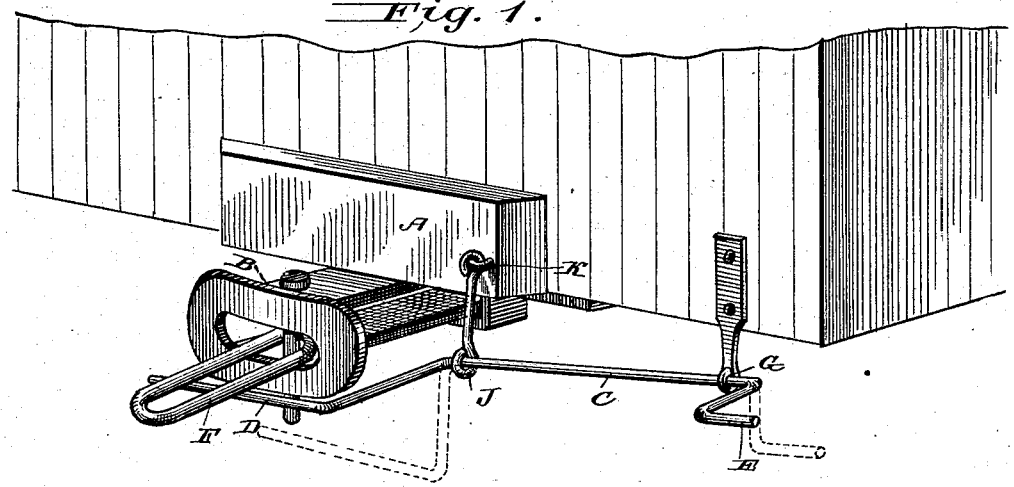
Figure 2:
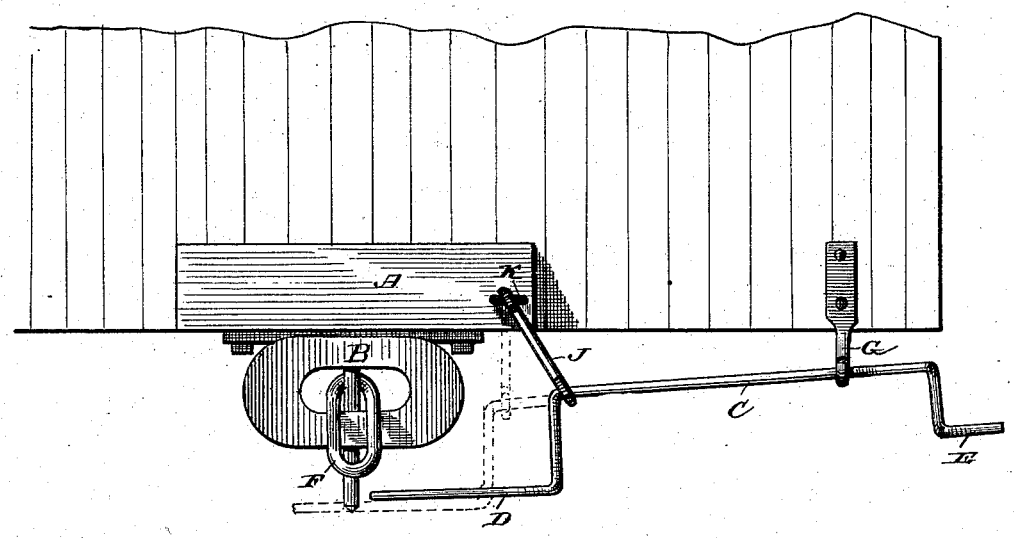

Figure 1 is a perspective view of the device as applied to the front of the platform of a car, showing a link lifted ready for coupling, the dotted lines showing the lever as it hangs when not in use. Fig. 2 is an end view, showing the lever drawn to one side to pass a long coupling-pin, the dotted lines showing the lever as it hangs when not in use.

Our invention relates to car-couplers, and has for its object the construction and application to the platform or other part of a car, near the draw-head, of a swinging crank-lever, by means of which the coupling-link can be elevated to the plane of the opposite draw-head without the operator going between the cars, thereby obviating danger of injury to body or limb.

In the accompanying drawings, the letter A indicates the front of a platform of a car with the usual draw-head B projecting. A lever, C, with a crank, D E, at both ends, is fulcrumed so that one crank, D, may be brought under and in contact with the coupling-link F, in order that said link may be elevated by turning the lever C, by means of the crank E, so as to raise the crank D to a horizontal or other plane. This lever is represented as fulcrumed, near one end, in an eyebolt, G, (which may be driven into the under side of the front of the platform, or may be attached to the front of the car when the platform does not extend across the end of the car,) and near the other end rests in a swinging link chain or hook, J, which is held to the platform by means of a staple, K, or other suitable device.

The link J allows the crank of the lever to hang below the draw-head B when not in use, and also to have a swinging motion, while the eyebolt G holds the end of the lever, so as to allow it very little, if any, side play. Both ends of the car are provided with the described device, and when not being operated the device hangs in the position shown in dotted lines in Figs. 1 and 2, the crank D being beneath the draw-head.

When two cars are to be coupled the operator, who stands outside of the cars or platform, grasps the crank E and turns it to the right, which movement throws the other end of the lever and its crank outward from the car, the link J assuming the position shown in Fig. 1 of drawings, the crank D striking the coupling-link F and elevating it to a horizontal plane, as shown in Fig. 1, the position in which it enters the draw-head of the car to be coupled. When the coupling-pin is longer than usual, and prevents the crank D from passing beneath it, the lever is drawn outward and passed to the side of the pin, as shown in Fig. 2 of the drawings. When the coupling has been completed the crank must be placed back of the pin, in which position it will not get damaged in case the draw-bar is pulled out, as often happens in heavily-loaded trains.

In coupling cars with this device the operator does not go between the cars, but stands outside thereof, and is able to perform his work as effectually as is done now with the usual pin-and-link coupling alone, and without subjecting his body or limbs to the danger of being caught and crushed between the cars.

The lever is generally made of three-fourths-inch iron, and a great many of them can be made in a day by a mechanic of ordinary skill, and at a trifling cost. It can be applied to cars in use with the ordinary link-and-pin coupling without any alteration being made in the car for that purpose.

Having described our invention, what we claim is—

1. A crank-lever having one end fulcrumed at or near the sides of a car, and the other end suspended at a point near the draw-head by means of a swinging connection attached to the end of the car, substantially as shown and described.

2. In a car-coupling, the combination of the draw-head of the car with a crank-lever fulcrumed at one point and suspended at another so as to be swung backward and forward, for the purpose set forth.

3. The lever C, provided with a crank at both ends, suspended by a swinging link, J, and fulcrumed at another point, in combination with the draw-head and coupling-link of a car, so as to be drawn to one side and passed around the pin.

In testimony that we claim the foregoing as our own we affix our signatures in presence of two witnesses.

S. C. ABBOT.
C. M. GATTRELL.

Witnesses:
A. E. SHINNICK,
JNO. M. WORSTALL.